(12) United States Patent
Lakomiak et al.

(10) Patent No.: US 8,290,630 B2
(45) Date of Patent: Oct. 16, 2012

(54) CONDITION MONITORING PARAMETER NORMALIZATION SYSTEM AND METHOD

(75) Inventors: Jason E. Lakomiak, Cleveland, OH (US); Gilles Lanthier, Brossard (CA)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 565 days.

(21) Appl. No.: 12/242,724

(22) Filed: Sep. 30, 2008

(65) Prior Publication Data
US 2010/0082158 A1  Apr. 1, 2010

(51) Int. Cl.
*G01M 1/38* (2006.01)
*G05B 13/00* (2006.01)
*G05B 15/00* (2006.01)

(52) U.S. Cl. ............ 700/280; 700/275; 73/1.82; 702/56

(58) Field of Classification Search .................. 700/280, 700/275, 90; 702/54, 56, 77; 73/1.48, 1.46, 73/1.82, 649
See application file for complete search history.

(56) References Cited

U.S. PATENT DOCUMENTS

| | | | |
|---|---|---|---|
| 3,455,149 A | | 7/1969 | Foster et al. |
| 4,285,241 A | * | 8/1981 | Smith et al. ..................... 73/579 |
| 4,480,480 A | * | 11/1984 | Scott et al. ....................... 73/769 |
| 5,251,151 A | | 10/1993 | Demjanenko et al. |
| 5,517,183 A | | 5/1996 | Bozeman et al. |
| 5,602,757 A | * | 2/1997 | Haseley et al. ................. 702/56 |
| 5,610,339 A | * | 3/1997 | Haseley et al. ................. 73/660 |
| 5,899,443 A | * | 5/1999 | Su ............................ 267/140.14 |
| 6,064,129 A | * | 5/2000 | Pompei ....................... 310/12.01 |
| 6,192,325 B1 | | 2/2001 | Piety et al. |
| 6,257,066 B1 | | 7/2001 | Chandler et al. |
| 6,260,004 B1 | * | 7/2001 | Hays et al. ..................... 702/183 |
| 6,296,093 B1 | * | 10/2001 | Norris et al. .................. 188/378 |
| 6,326,758 B1 | | 12/2001 | Discenzo |
| 6,402,089 B1 | * | 6/2002 | Kiss et al. .................. 244/17.27 |

(Continued)

FOREIGN PATENT DOCUMENTS
DE  19855874  10/1999
(Continued)

OTHER PUBLICATIONS

Barrett Jr., R.M., "Low Frequency Machinery Monitoring: Measurement Considerations", Aug. 1993, Wilcoxon Research, Inc., Retrieved from the Internet at "saba.kntu.ac.ir/eecd/ecourses/instrumentation/projects/reports/seismic1/application/ind.ap/industrial%206.pdf" on Jun. 13, 2012.*

(Continued)

*Primary Examiner* — Mohammad Ali
*Assistant Examiner* — Kelvin Booker
(74) *Attorney, Agent, or Firm* — Fletcher Yoder, P.C.; Alexander R. Kuszewski; John M. Miller

(57) ABSTRACT

In one embodiment, the disclosed method includes controlling operation of a machine system via actuators and a first set of signals received from sensors, receiving a second signal from a vibration sensor, calculating vibration parameters based on the second signal. The method further includes the steps of normalizing each of the vibration parameters and presenting the normalized vibration parameters in an operator interface. In another embodiment, the system includes a controller configured to receive sensor signals from a machine system and to control operation of the machine system via actuators. The system also includes a condition monitoring user interface configured to display normalized vibration parameters for the machine system.

21 Claims, 9 Drawing Sheets

U.S. PATENT DOCUMENTS

| | | | |
|---|---|---|---|
| 6,460,803 B1* | 10/2002 | Kiss et al. | 244/54 |
| 6,505,131 B1* | 1/2003 | Henrot | 702/54 |
| 6,510,397 B1* | 1/2003 | Choe | 702/116 |
| 6,546,814 B1* | 4/2003 | Choe et al. | 73/862.08 |
| 6,556,939 B1* | 4/2003 | Wegerich | 702/127 |
| 6,560,552 B2* | 5/2003 | Shen et al. | 702/56 |
| 6,646,397 B1 | 11/2003 | Discenzo | |
| 6,662,118 B2 | 12/2003 | Carle et al. | |
| 6,663,349 B1 | 12/2003 | Discenzo et al. | |
| 6,687,654 B2* | 2/2004 | Smith et al. | 702/183 |
| 6,694,285 B1* | 2/2004 | Choe et al. | 702/182 |
| 6,746,005 B1* | 6/2004 | Su et al. | 267/140.14 |
| 6,763,312 B1* | 7/2004 | Judd | 702/56 |
| 6,768,938 B2* | 7/2004 | McBrien et al. | 702/56 |
| 6,768,949 B2 | 7/2004 | Shupe et al. | |
| 6,801,864 B2* | 10/2004 | Miller | 702/56 |
| 6,804,628 B2 | 10/2004 | Gross et al. | |
| 6,847,854 B2 | 1/2005 | Discenzo | |
| 6,868,348 B1 | 3/2005 | Stoutenburg et al. | |
| 7,050,873 B1 | 5/2006 | Discenzo | |
| 7,089,099 B2* | 8/2006 | Shostak et al. | 701/32 |
| 7,103,460 B1* | 9/2006 | Breed | 701/29 |
| 7,143,016 B1 | 11/2006 | Discenzo et al. | |
| 7,301,296 B1 | 11/2007 | Discenzo | |
| 7,308,322 B1 | 12/2007 | Discenzo et al. | |
| 7,313,467 B2* | 12/2007 | Breed et al. | 701/1 |
| 7,379,800 B2* | 5/2008 | Breed | 701/29 |
| 7,408,453 B2* | 8/2008 | Breed | 340/442 |
| 7,444,210 B2* | 10/2008 | Breed et al. | 701/1 |
| 7,467,034 B2* | 12/2008 | Breed et al. | 701/29 |
| 7,549,327 B2* | 6/2009 | Breed | 73/146 |
| 7,561,200 B2* | 7/2009 | Garvey et al. | 702/184 |
| 7,564,163 B2* | 7/2009 | Onoda et al. | 310/316.01 |
| 7,593,784 B2* | 9/2009 | Carle et al. | 700/175 |
| 7,596,242 B2* | 9/2009 | Breed et al. | 701/45 |
| 7,603,894 B2* | 10/2009 | Breed | 73/146 |
| 7,630,802 B2* | 12/2009 | Breed | 701/29 |
| 7,650,210 B2* | 1/2010 | Breed | 701/29 |
| 7,660,437 B2* | 2/2010 | Breed | 382/104 |
| 7,663,502 B2* | 2/2010 | Breed | 340/12.25 |
| 7,672,756 B2* | 3/2010 | Breed | 701/1 |
| 7,693,626 B2* | 4/2010 | Breed et al. | 701/29 |
| 7,738,678 B2* | 6/2010 | Breed et al. | 382/100 |
| 7,760,080 B2* | 7/2010 | Breed et al. | 340/447 |
| 7,786,864 B1* | 8/2010 | Shostak et al. | 340/572.1 |
| 7,880,594 B2* | 2/2011 | Breed et al. | 340/425.5 |
| 7,889,096 B2* | 2/2011 | Breed | 340/12.51 |
| 7,920,102 B2* | 4/2011 | Breed | 345/7 |
| 8,011,583 B2* | 9/2011 | Lei et al. | 235/438 |
| 2002/0138127 A1 | 9/2002 | Stiger et al. | |
| 2002/0153451 A1* | 10/2002 | Kiss et al. | 244/17.27 |
| 2002/0169569 A1* | 11/2002 | Miller | 702/56 |
| 2003/0061008 A1* | 3/2003 | Smith et al. | 702/188 |
| 2004/0030419 A1 | 2/2004 | Miyasaka et al. | |
| 2004/0138832 A1* | 7/2004 | Judd | 702/56 |
| 2004/0176902 A1* | 9/2004 | McBrien et al. | 701/100 |
| 2004/0199368 A1* | 10/2004 | Bechhoefer | 703/7 |
| 2004/0236218 A1* | 11/2004 | Taniguchi et al. | 600/437 |
| 2005/0060123 A1 | 3/2005 | Schiltz et al. | |
| 2005/0192727 A1* | 9/2005 | Shostak et al. | 701/37 |
| 2006/0284839 A1* | 12/2006 | Breed et al. | 345/156 |
| 2007/0205881 A1* | 9/2007 | Breed | 340/447 |
| 2007/0227251 A1 | 10/2007 | Loesl et al. | |
| 2007/0271014 A1* | 11/2007 | Breed | 701/29 |
| 2007/0282506 A1* | 12/2007 | Breed et al. | 701/45 |
| 2008/0040005 A1* | 2/2008 | Breed | 701/48 |
| 2008/0046149 A1* | 2/2008 | Breed | 701/45 |
| 2008/0065290 A1* | 3/2008 | Breed et al. | 701/29 |
| 2008/0114557 A1* | 5/2008 | Lambert | 702/77 |
| 2008/0140278 A1* | 6/2008 | Breed | 701/29 |
| 2008/0147265 A1* | 6/2008 | Breed | 701/30 |
| 2008/0147271 A1* | 6/2008 | Breed | 701/36 |
| 2008/0161989 A1* | 7/2008 | Breed | 701/29 |
| 2008/0284575 A1* | 11/2008 | Breed | 340/438 |
| 2009/0129882 A1* | 5/2009 | Tchouprakov et al. | 409/131 |
| 2009/0282910 A1* | 11/2009 | Song et al. | 73/290 V |
| 2010/0082158 A1* | 4/2010 | Lakomiak et al. | 700/275 |
| 2010/0082164 A1* | 4/2010 | Lakomiak et al. | 700/280 |
| 2010/0082273 A1* | 4/2010 | Lakomiak et al. | 702/56 |
| 2010/0147627 A1* | 6/2010 | Lakomiak et al. | 184/7.4 |
| 2010/0268423 A1* | 10/2010 | Breed | 701/45 |
| 2011/0154999 A1* | 6/2011 | Schoch | 100/257 |
| 2012/0089299 A1* | 4/2012 | Breed | 701/36 |

FOREIGN PATENT DOCUMENTS

| | | |
|---|---|---|
| EP | 1338873 | 8/2003 |
| WO | 2008/142386 A1 | 11/2008 |

OTHER PUBLICATIONS

Commtest Instruments Ltd., "Commtest The Revolution-Beginner's Guide to Machine Vibration: Revision Jun. 28, 2006", 2006, Commtest Instruments Ltd, Christchurch, New Zealand, Retrieved from the Internet at "www.Commtest.com" on Jun. 13, 2012.*

SKF Condition Monitoring, Inc., "SKF Condition Monitoring", Nov. 1999, Retrieved from the Internet at "www.skf.com/files/260860.pdf" on Jun. 13, 2012.*

Watson, M.J.; Byington, C.S. and Behbahani, A., "Very High Frequency Monitoring System for Engine Gearbox and Generator Health Management", 2007, SAE International, paper 07ATC-268, Retrieved from the Internet at "www.rlwinc.com".*

Young, J.C., "Thesis: Vibration Analysis Using a MEMS Accelerometer", Dec. 2006, Naval Postgraduate School, Monterey, California.*

EP09171629.0 Extended European Search Report, Dec. 3, 2009.

EP09171628.2 Extended European Search Report, Dec. 1, 2009.

"Dynamix Integrated Condition Monitoring"; Publication ICM-PP001A-EN-E; Jul. 2008 (www.rockwellautomation.com).

European Search Report for Application No. EP09171621.

* cited by examiner

CONDITION MONITORING PARAMETER NORMALIZATION SYSTEM AND METHOD

BACKGROUND

The invention relates generally to the field of systems for monitoring of mechanical machine systems. More particularly, the invention relates to systems and methods for configuring, processing, and presenting machine condition monitoring information.

Various systems and components may be used to monitor and protect industrial equipment and machines. Depending upon the type of mechanical system, the monitoring and protection components may generate various signals representative of dynamic conditions. The signal-generating components may be sensors and transducers positioned on points of interest of the machine systems. The signals are applied to monitoring circuits that are somewhat remote from the points of interest, and are used to analyze the performance of the machine system. Machine systems thus instrumented may include rotary machines, fans/blowers, pumps, assembly lines, production equipment, material handling equipment, power generation equipment, as well as many other types of machines of varying complexity.

By way of example, one type of condition that may be monitored in rotary and other dynamic machine systems is vibration. Information indicative of vibration may be collected by accelerometers on or adjacent to points of interest of a machine, and conveyed to monitoring equipment. However, the information from the accelerometers must be processed, analyzed, and considered in conjunction with other factors, such as operating speeds, to determine the appropriate response to machine conditions. Configuring the monitoring systems to gather this information may require input of detailed information about the machine system, such as bearing types and serial numbers. Moreover, processing the information or data requires equipment in addition to that used for controlling the machine systems. Further, the processed data may require a user with specialized knowledge and training to properly assess the state of the machine system being monitored.

BRIEF DESCRIPTION

In one embodiment, the disclosed method includes controlling operation of a machine system via actuators and a first set of signals received from sensors, receiving a second signal from a vibration sensor, calculating vibration parameters based on the second signal. The method further includes the steps of normalizing each of the vibration parameters and presenting the normalized vibration parameters in an operator interface. In another embodiment, the system includes a controller configured to receive sensor signals from a machine system and to control operation of the machine system via actuators. The system also includes a condition monitoring user interface configured to display normalized vibration parameters for the machine system.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
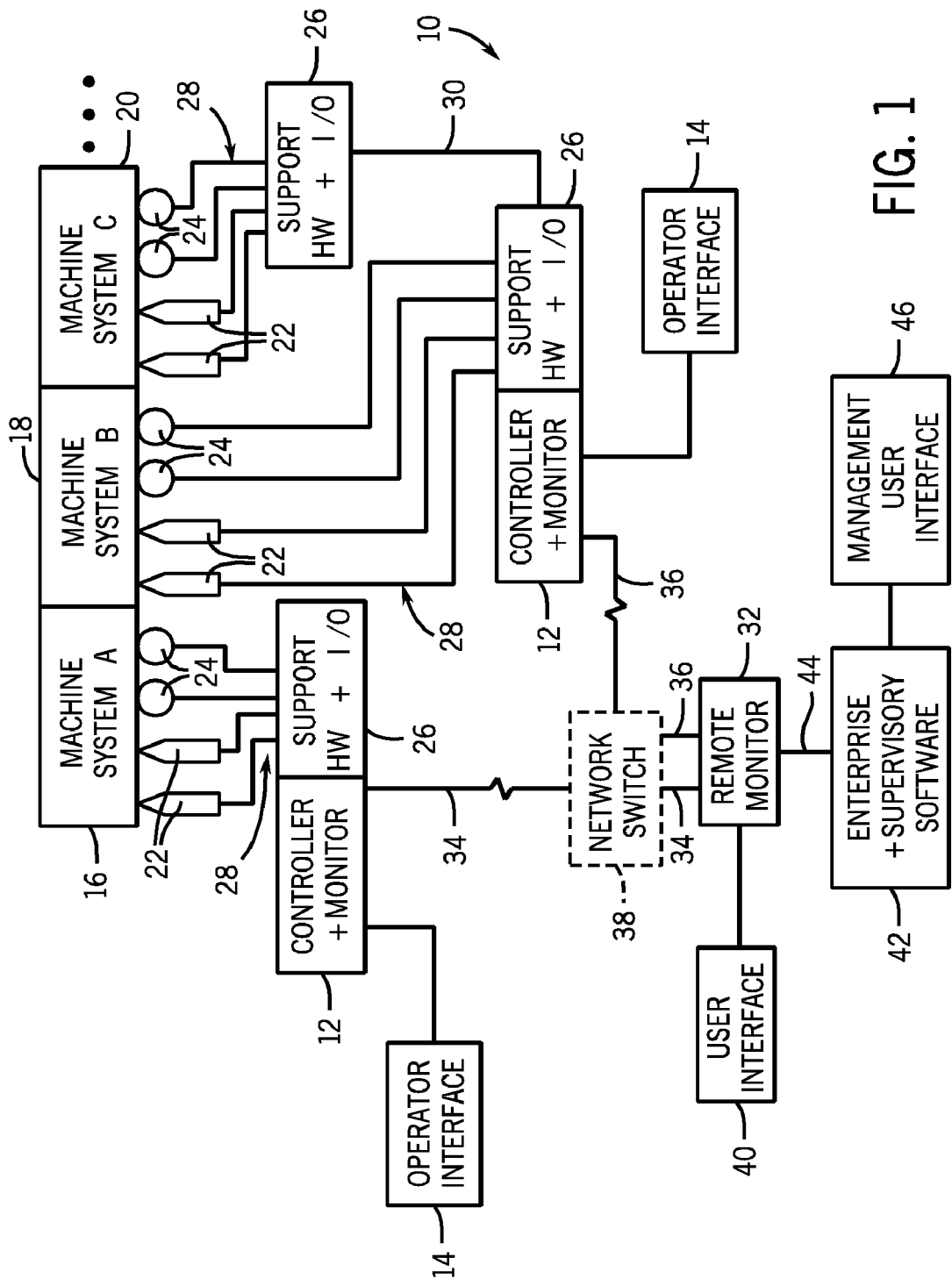
FIG. 1 is a block diagram of a machine condition monitoring and control system in accordance with an embodiment of the present technique.

Turning now to the drawings, and referring first to FIG. 1, a diagrammatical overview of an embodiment of a machine condition monitoring and control system 10 is illustrated. The machine condition monitoring and control system 10 is particularly well suited for monitoring, detecting, and controlling a wide range of dynamic operating parameters of mechanical machine systems. In particular, the system is well suited to various types of rotary equipment, although other applications may be envisaged for certain aspects of the present technique. As referred herein, the term "dynamic operating condition" or the reference to condition monitoring is intended to convey physical conditions or parameters of a mechanical machine system, as opposed, for example, the electrical conditions. The dynamic conditions may include such characteristics as vibration, rotation, speed, temperature, pressure, and so forth.

The condition monitoring and control system 10 is designed to allow monitoring and control of multiple machine systems, conditions, and/or parameters at various points along a machine system. A system controller and monitor 12 is operationally connected to various hardware and components of the machine system with which condition monitoring and control system 10 is associated, and operates on the basis of software that enables an operator to view the status of the system via operator interface 14. The controller and monitor 12 may be an industrial computer, a programmable logic controller or any similarly capable device. Operator interface 14 may allow a user, without detailed knowledge or training in machine condition monitoring, to configure condition monitoring and control system 10, thereby enabling the system to monitor various machine condition parameters, including vibration data. For example, in a presently contemplated embodiment, a user or operator may configure multiple machine systems, such as machine system A (16), machine system B (18), and machine system C (20). Machine systems 16, 18, and 20 may be any conceivable type of system susceptible to such automation, and may be part of separate or linked machines. Examples of such systems include fan/blower machine systems, pump systems, motor systems, conveyor systems, to mention only a few. Further, machine systems 16, 18, and 20 may each be composed of several machine systems. For instance, machine system A may include a motor system and a fan/blower system.

As depicted, a user may configure systems 16, 18, and 20 to be controlled and monitored by condition monitoring and control system 10 using a software interface that provides an auto-configuration for the system. For example, machine system A 16 may be configured as a fan/blower system via operator interface 14, where the user selects that the system is a fan/blower machine system type. The operator may further configure the machine system by indicating the number and type of sensors, such as accelerometers to monitor machine system A 16. This enables the operator to configure controller and monitor 12 to dynamically monitor the condition of one of more machine systems without detailed knowledge of each machine system. For example, the operator may utilize the display on an operator interface 14 to configure the machine system without entering detailed information, such as individual bearing type, size, and so forth. In another embodiment, one controller and monitor 12 may be coupled to several machine systems via a switch, or other multiplexing device that routes the signals between the system components. In an embodiment, each machine system 16, 18, and 20 may be coupled to a controller and monitor 12. Further, any number of machine systems (or subsystems) may be included in a single condition monitoring and control system 10.

Machine systems 16, 18, and 20 may each have multiple sensors 22 and actuators 24 positioned at various locations in each machine system. For example, vibration sensors 22 located in a blower/fan embodiment of machine system A 16 may be placed on various bearings that support a rotating shaft of the fan system. In other words, sensors 22, in the form of accelerometers, may monitor vibrational data at various points along the rotational shaft of a fan in machine system A 16. Further, actuators 24 may be used to control machine systems 16, 18, and 20, thereby ensuring that these machine systems are operating within certain permissible control parameters. For instance, if a specified alarm level temperature is sensed by a thermocouple sensor in a pump system, an actuator 24 may be closed to terminate the pumping process, thereby avoiding an overheating condition in the pump machine system. Sensors 22 and actuators 24 may be connected to support hardware 26 via network or electrical wire leads 28. In an embodiment, support hardware 26 may be measurement hardware capable of translating the measurement signal to information readable by controller and monitor 12. For example, support hardware 26 may contain analog to digital converters, hardware filters, and other signal conditioning devices. Further, support hardware 26 may contain input or output devices that communicate control commands to actuators 24.

Condition monitoring and control system 10 may monitor a wide range of dynamic operating conditions on a continuous basis for machine information, protection, monitoring, and control purposes. Accordingly, the condition monitoring and control system 10 may include a series of sensors, detectors, transducers, or actuators mounted on various points of the machine system to detect the desired dynamic operating conditions. As depicted, a support hardware module may be remotely connected via connection 30 and may use any appropriate data communications protocol, such as a DeviceNet or Ethernet, thereby providing remote control of support hardware 26. Communications may also be performed wirelessly, or some of the communications may be via conventional wired connections, while others are wireless. As will be discussed in detail below, condition monitoring and control system 10 enables an operator to simply configuration of condition monitoring of machine systems via operating interface. Condition monitoring and control system 10 also enables a user to perform complex calculations to condition monitoring and vibration data and information via software on controller and monitor 12. For example, a user may select to perform an FFT calculation and a spike energy calculation on vibration data of a fan/blower machine system. The results of selected software calculation for each machine system type may then be presented and normalized for an untrained operator to assess and diagnose each machine system configured.

A monitor 32 may be used to remotely perform system configuration tasks and present the condition monitoring data to a system operator. For instance, a remote monitor 32, including a computer, may be linked via Ethernet connections 34 and 36 to controller and monitor system 12, thereby enabling a monitor 12 and attached computer to organize, configure, and present the condition monitoring data alongside the controls and configuration for a control system. A network switch 38 may be placed within network connections 34 and 36, thereby routing the condition monitoring and control information across a potentially larger distance. For example, monitor 32, computer and user interface 40 may be located at a manager's desk away from the factory floor where controller and monitor 12 may be located. In some embodiments, the networking hardware 34, 36, and 38 may utilize Ethernet, 802.11, Bluetooth, controller-area network, or other suitable communication techniques and apparatus. In addition, condition monitoring and control system 10 may include enterprise and supervisory software 42 that may be linked via network connection 44 to the controller and monitors 12 and 32. Enterprise and supervisory software 42 may harvest data from a database containing condition monitoring and control information, to present a machine condition and control system status to a manager via a management user interface 46. Operator interface 14, user interface 40, and management user interface 46 may include any number of suitable display devices, such as a liquid crystal display (LCD) monitor, a personal data assistant (PDA), or a telephone. Management user interface 46 may display information such as a vibration profile and/or vibrational trend data over a time period plotted against alarm values and baseline values for the vibration data. Further, management user interface 46 may present statistical process control information or other historical data in a manner that enables a manager to view the status of one or more machine systems.

The various sensors 22 of the condition monitoring and control system 10 may produce a wide range of signals and information based upon the detected dynamic machine operating conditions. Each sensor 22 may generate one or more signals which are communicated to controller and monitor 12. The various sensors 22 and/or transducers may be active or passive, and may receive power for operation via connection lines 28. For example, the sensors 22 of an instrumented turbine machine system B 18 may detect dynamic machine operating conditions such as valve position and case extension, bearing absolute casing vibration, both in X and Y directions, differential expansion, speed of rotation, rotational phase, and so forth. As appreciated, various sensors and transducers may be employed for these measurements, including Lanier variable differential transformers, non-contact pickups, rotary potentiometers, accelerometers, and so forth. In an embodiment, the particular configuration of controller and monitor system 12 may be connected to a specially adapted vibration monitor located in support hardware 26, designed to be coupled a tachometer and accelerometer. In addition, hardware and software within condition monitoring and control system 10 may process the input signals to produce vibrational data and parameters which may be used to analyze the performance and/or operating conditions of the mechanical machine system. As appreciated, certain of the machine conditions or vibration parameters may be particularly indicative of abnormal and unwanted conditions, such as wear, impending failure, unbalance, excessive loading, misalignment, looseness, and so forth.

Figure 2:
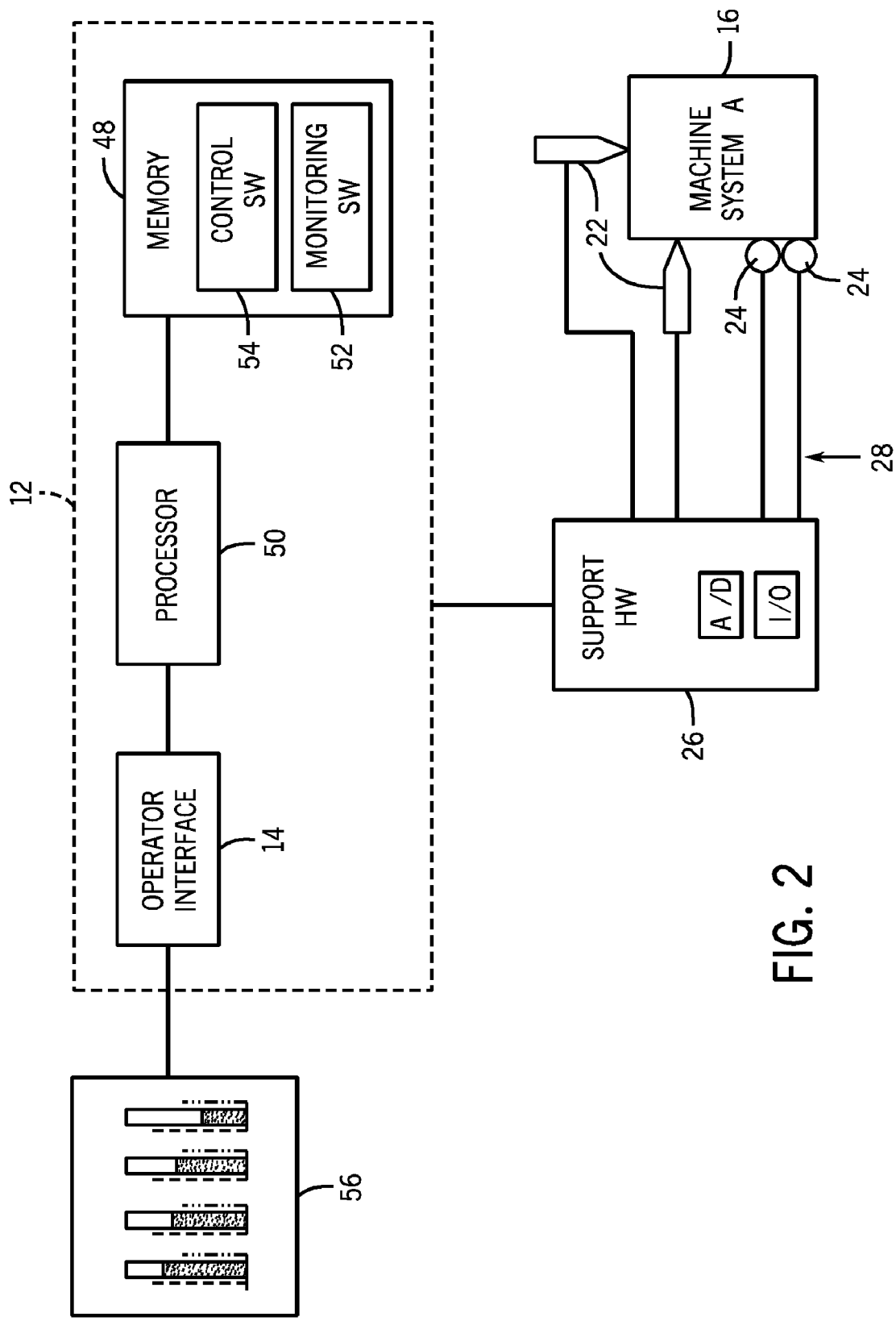
FIG. 2 is a block diagram of certain components of the condition monitoring and control system, as shown in FIG. 1, including a controller and monitor, support hardware, and a machine system in accordance with an embodiment of the present technique.

FIG. 2 is a diagram of an embodiment of condition monitoring and control system 10 including controller and monitor 12, support hardware 26 and machine system A 16. As depicted, controller and monitor 12 is a computer system that includes memory 48, processor 50 and operator interface 14 for display of machine system type and information. Memory 48 may be a hard disk or other disk storage device which may have software applications installed which assist in management of the machine systems and processes. In an embodiment, memory 48 includes machine condition monitoring software 52 and machine control software 54. As discussed further below, condition monitoring software 52 may include functional blocks that perform complex calculations on vibrational data and information that has been communicated to controller and monitor 12 via support hardware 26. This configuration reduces the complexity and number of components in the conditioning monitoring system. Further, the system will not need separate hardware and/or processing devices to perform each of the selected function blocks. Support hardware 26 may include signal conditioning and translation hardware such as an analog to digital converter (A/D), input and/or output devices. Support hardware 26 may receive condition monitoring signals, including vibration information, from sensors 22, which are mounted on appropriate locations of machine system A 16. In addition, support hardware 26 may include connections via lines 28 to actuators 24 that may be used to initiate or terminate processes within machine system A 16. For example, control software 54 running on controller and monitor 12 may communicate with support hardware 26, thereby instructing actuators 24 to close if a certain alarm limit is exceeded.

As depicted, display 56 is a connection to operator interface 14, which is included in control condition monitoring and system 10. In an embodiment, display 56 may enable an operator to assess a machine system condition via normalized indicators or parameters. Such indicators may include overall vibration, unbalance, looseness, bad bearing, and so forth. A normalized indication of these machine system parameters enable a operator to see scaled data that may be scaled from 0 to 100%, where 100% is an alarm level, 75% is a warning level, and 50% is an average level. This is an alternative to raw data presentation that may be in the form of frequency, revolutions per minute (RPM), magnitude, and other measurement units. By translating or scaling the data to normalized indicators, the condition monitoring and control system 10 allows a user to assess a parameter status without having condition monitoring expertise or having to refer to standard industry tables and/or charts for particular bearings or components.

Figure 3:
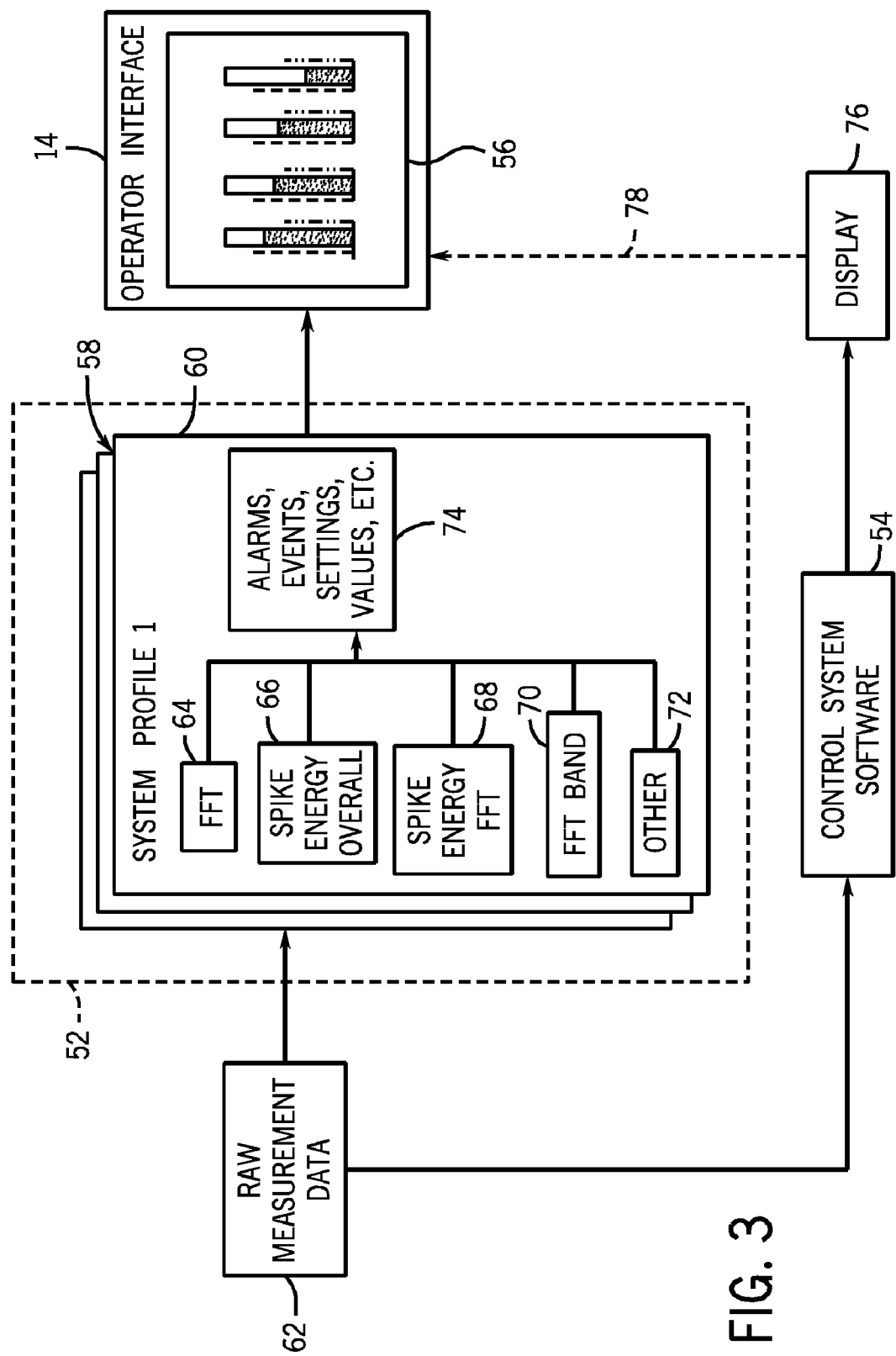
FIG. 3 is a block diagram of certain components of the condition monitoring and control system, as shown in FIG. 1, including monitoring software, system type profiles, and an operator interface in accordance with an embodiment of the present technique.

FIG. 3 is an illustration of an embodiment of certain components of condition monitoring and control system 10, including condition monitoring software 52, control software 54, and operator interface 14. As depicted, monitoring software 52 may enable a user to choose from several machine system type profiles 58, thereby enabling the user to configure calculations and algorithms that are tailored to a particular machine system being analyzed and monitored. The machine system type profiles 58 may correlate to a specific machine component combination, such as a fan machine system with two accelerometers and three actuators. The machine system type profile 58 may include information, such as look up tables, operating parameters, diagnostic information, filters, and alarms that correspond to the specific machine component combination. For instance, in machine system profile A 60, raw vibration measurement data 62 may be received by support hardware 26 from accelerometer sensors 22, thereby providing information about the machine system being monitored. In the example, the information from raw vibration measurement data 62 may be fed into monitoring software 52 and several function block modules selected by the user may perform calculations on the raw vibration measurement data 62. The function blocks selected may include FFT function block 64, spike energy function block 66, spike energy FFT function block 68, FFT band function block 70, and other calculation function blocks 72. As described in greater detail below, the FFT function block 64 may provide information and parameters that are useful in analyzing machine vibration data. The spike energy function block 66 and spike energy FFT function block 68 may be measured and analyzed as discussed in U.S. Pat. No. 6,868,348, which is herein incorporated by reference in its entirety for all purposes.

The complex calculations and algorithms performed on the raw measurement data 62 may then feed the results of such function blocks to an appropriate set of parameters, which are specific to the type of system and machine profile selected. The machine system-specific data table 74 may include parameters such as alarms, events, settings, initial values, and so forth for each of the calculations performed on the data. For example, an FFT calculation may be performed by function block 64 on the raw measurement data 62, in the form of vibrational information and data. The results of the selected calculation function blocks may be compared to values located in a data table 74 that may correspond to alarms or events for that particular calculation function block within that machine system type profile. In an embodiment, the operator may select the machine system type profile 58 which includes the machine system(s), sensor(s), and actuator(s) in the system being monitored.

For example, raw measurement data 62 may be vibration data that is communicated to spike energy overall function block 66, which then processes the measurement information producing an overall value for spike energy. The overall spike energy value for the vibration data may be compared to an alarm value for spike energy overall data for the selected system profile. If the calculated spike energy overall value exceeds an alarm in data table 74, the data table may alert the user of an alarm level and also recommend diagnostic and troubleshooting steps for the user based on the alarm. These diagnostic and troubleshooting messages are also based upon the machine system type profile and function blocks performed. Again, the diagnostic information may be provided in a simplified or normalized manner to operator interface 14, thereby enabling the user to diagnose and troubleshoot the machine system problems without having detailed knowledge of condition monitoring data or condition monitoring systems. Further, controller and monitor 12 may also include machine control software that actively regulates and controls the processes and performance of various machine systems. The control settings for the condition monitoring and control system 10 may be shown on display screen 76 along with other critical control system information. Moreover, in one embodiment, this information may be available to the user while accessing condition monitoring parameters on operator interface 14. This optional connection is illustrated by line 78.

Figure 4:
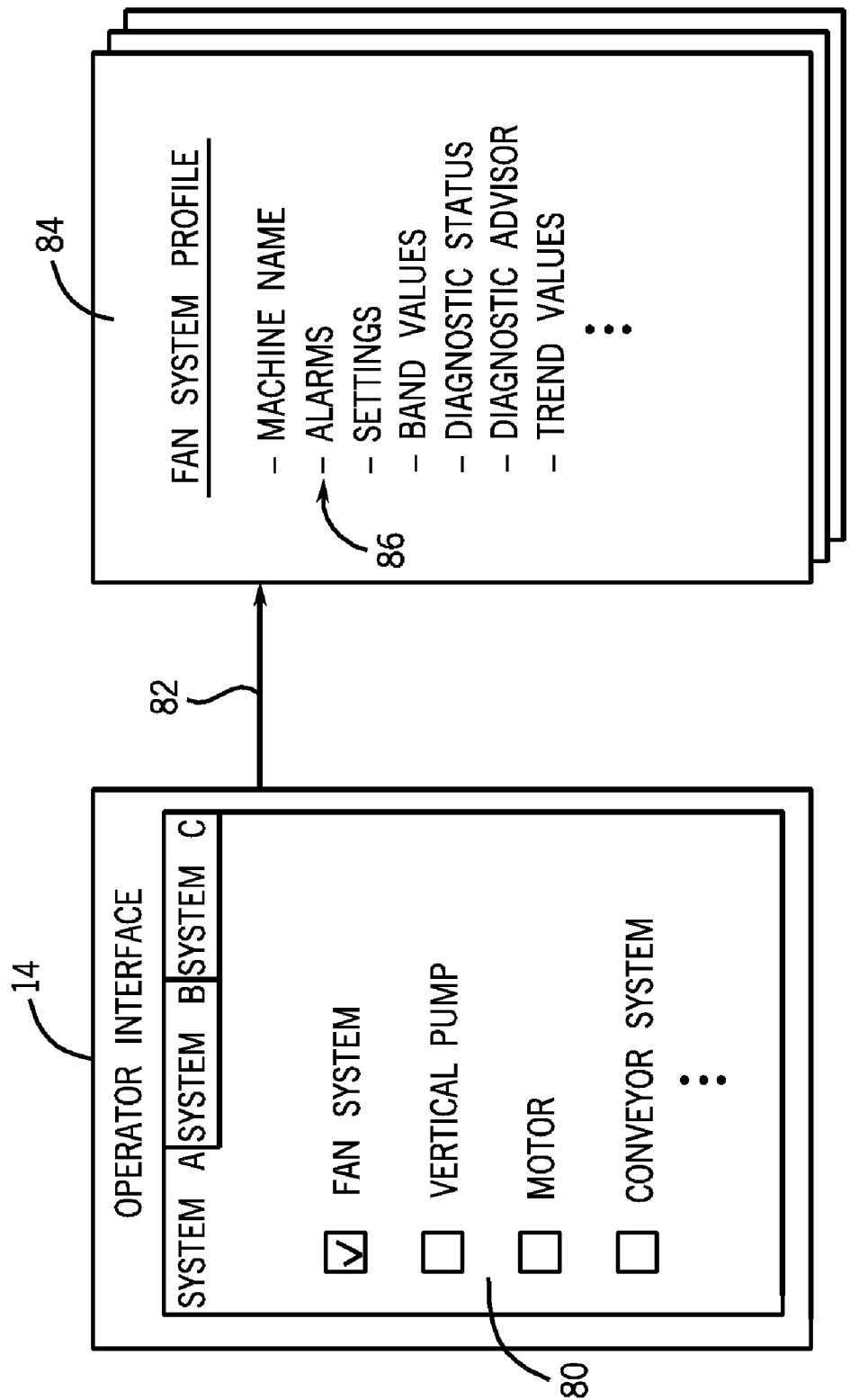
FIG. 4 is a block diagram of certain components of the condition monitoring and control system, as shown in FIG. 1, including the operator interface, a selection prompt, and a system type profile in accordance with an embodiment of the present technique.

FIG. 4 is an illustration of an embodiment of operator interface 14, including machine system selection interface 80. Machine selection interface 80 may allow an operator to choose the type of machine system that is connected to machine condition monitoring and control system 10. For example, a user may select between several machine system types, including a fan system, vertical pump system, motor system, conveyor system, turbine system, and so forth. Further, the operator interface 14 and machine system selection interface 80 may enable a user to configure several machine systems with a single condition monitoring and control system 10. As depicted, system A may be one machine type, such as a fan system, system B may be different machine system type, such as a pump system, that will be monitored by condition monitoring and control system 10 and may be configured and observed by a system operator. Once a system operator selects a system type for each machine system, the machine system selection interface communicates the user selection, indicated by arrow 82, to a corresponding system type or profile 84.

The corresponding system type or profile may include a table of information for each system, thereby enabling an automatic configuration of the selected system type based on information in the system type profile 84, indicated by element 86. System profile information 86 may include information such as machine name, alarm values, settings, band values, diagnostic status, diagnostic adviser, trend values, and so forth. As appreciated, the appropriate system profile information 86 may allow a user to configure condition monitoring of the selected system without in depth knowledge of the machine system. Further, the system profile information 86 enables an operator to configure the machine system without referring to industry standard tables during analysis of the condition monitoring data for the system. In addition, a library of machine system type profiles is available to the operator for each machine system to be configured by condition monitoring and control system 10. Machine system selection interface 80 may be a user interface of condition monitoring software 52 that enables an operator to set up and configure condition monitoring of several types of machine systems without requiring specific knowledge of machine condition monitoring or details about the machine systems, including bearing types and serial numbers. Further, condition monitoring and control system 10 includes condition monitoring software 52 and machine system profile information 84 that provides corresponding information to the machine system type selected, including diagnostic and troubleshooting information that enables an operator who is not familiar with the condition monitoring analysis to troubleshoot the particular system based on the data analyzed by the condition monitoring software 52. For example, if an alarm limit is exceeded when compared to vibration data analyzed by the system, the operator interface 14 may provide the user with a series of prioritized diagnostic and troubleshooting messages. These diagnostic and troubleshooting messages may provide the user with machine system components to investigate and provide steps to take while diagnosing the detected problem.

Figure 5:
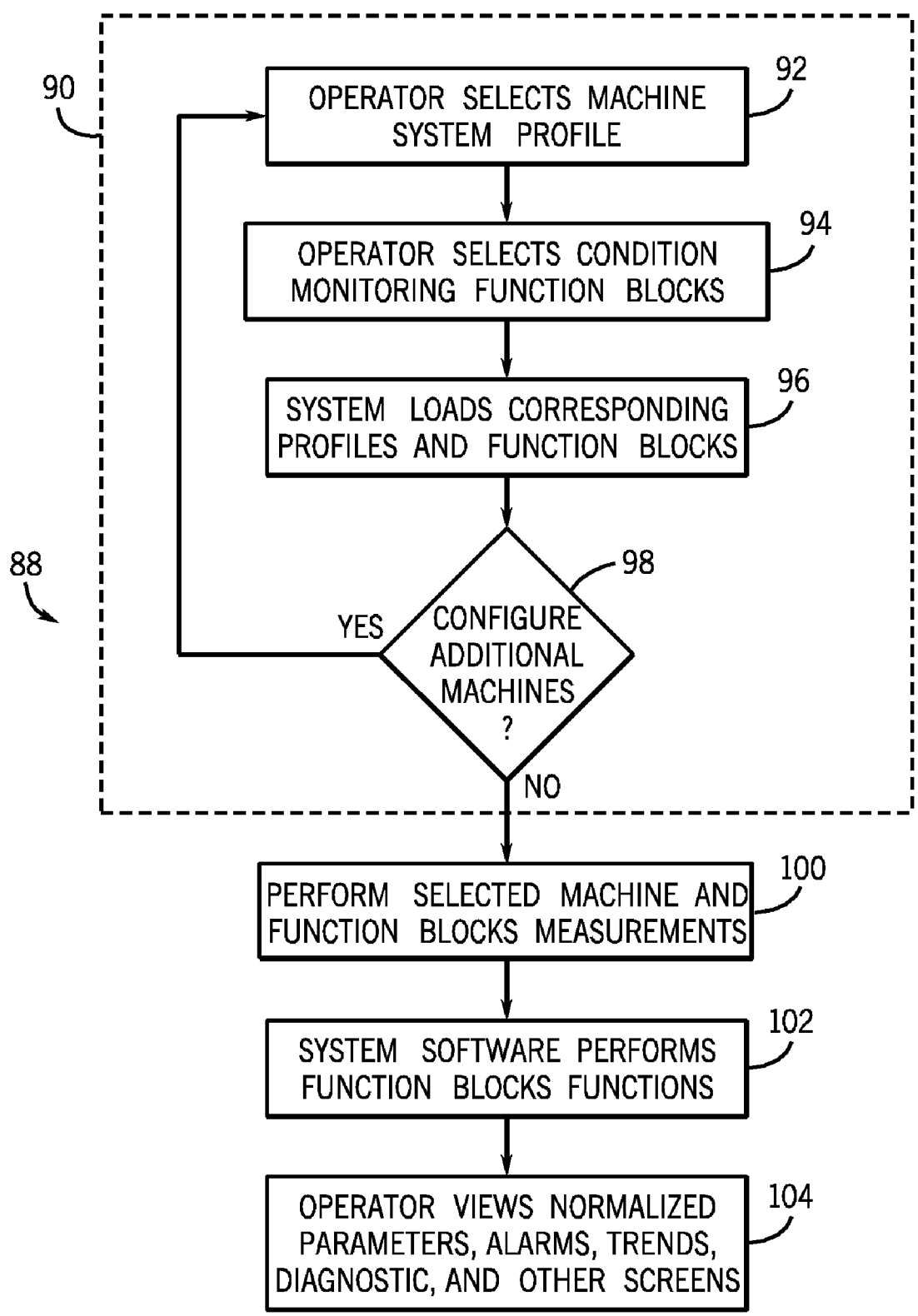
FIG. 5 is a flow chart of the auto-configuration and operation of the condition monitoring and control system, in accordance with an embodiment of the present technique.

FIG. 5 is a flowchart of an exemplary method 88 for auto-configuration of the condition monitoring and control system 10. The method 88 may be an integrated part of monitoring software 52 and may be displayed to an operator on operator interface 14, as discussed above. Indeed, the method 88 may be one exemplary embodiment of the auto-configuration techniques discussed above. Configuration or installation step 90 encompasses all steps that may be considered installation or configuration steps for condition monitoring and control system 10. For example, the steps included in installation step 90 include procedures and steps that are performed before any condition monitoring measurements, control, or analysis are performed on the attached machine systems. In step 92, an operator may select a machine system type or profile from a menu, as may be displayed on operator interface 14. As previously discussed, the selected machine system type profile may correspond to a table of information and data pertaining to that particular machine system type, thereby enabling the user to configure the system without manually inputting specific values and other settings. In step 94, the operator may select condition monitoring software function blocks to be performed on the data and measurements acquired by the condition monitoring and control system 10. For instance, the operator may select several calculation function blocks to be performed on vibration measurement data, including an FFT analysis, a spike energy calculation, a spike energy FFT calculation, and/or a band FFT calculation, to be performed on the vibration measurement information. In step 96, the condition monitoring and control system 10 may load the corresponding machine system profile and function blocks selected. In step 98, the operator may choose to configure additional machine systems. If the operator chooses to configure additional machine systems, the embodiment of auto-configuring method 88 may route the user back to step 92. If the operator chooses not to configure additional machines, the operator may proceed from installation and configuration step 90.

In step 100, the condition monitoring and control system 10 may execute and perform the selected machine system and calculation function block measurements on the selected machine system. In step 102, the conditioning monitoring software performs the selected calculation function block functions on the raw data acquired in step 100. For instance, the system software, including condition monitoring software 52 may perform FFT analysis and spike energy overall calculations on raw vibration data acquired by condition monitoring and control system 10. In step 104, the operator may view generic or normalized condition monitoring parameters, including alarms, trends and other screens such as diagnostic information. For example, the operator may view a series of scaled indicators that pertain to critical system condition parameters, including unbalance, looseness, misalignment, overall vibration, and bad bearing. These scaled indicators may be referred to as normalized parameters or normalized indicators due to the fact that the calculated and/or measured values for these particular parameters may be linearly or non-linearly scaled based on alarm limits and/or related equations provided in the machine system profile. In one embodiment, the scaled normalized indicators may provide a reading of 100% at an alarm level and 50% at a warning level for the indicator. Further, the system may indicate 25% for the particular parameter at an average reading for the normalized indicator. These normalized indicators allow an operator to assess the status of a machine system without having knowledge of the system components, alarm levels for the system, and units used to calculate an indicator's status. In other words, these normalized indicators enable an operator with minimal knowledge of the machine system to assess the state of the system via these machine condition monitoring parameters that have been genericized or normalized. Moreover, the machine condition monitoring and control system 10 may provide the operator with diagnostic information that corresponds to these normalized system indicators, such as recommended troubleshooting steps and/or components to examine. Further, the user interface may provide an operator with prioritized troubleshooting steps, thereby providing an operator with the most important and relevant troubleshooting information first and further providing the user with the most relevant information to address a machine condition monitoring problem.

Figure 6:
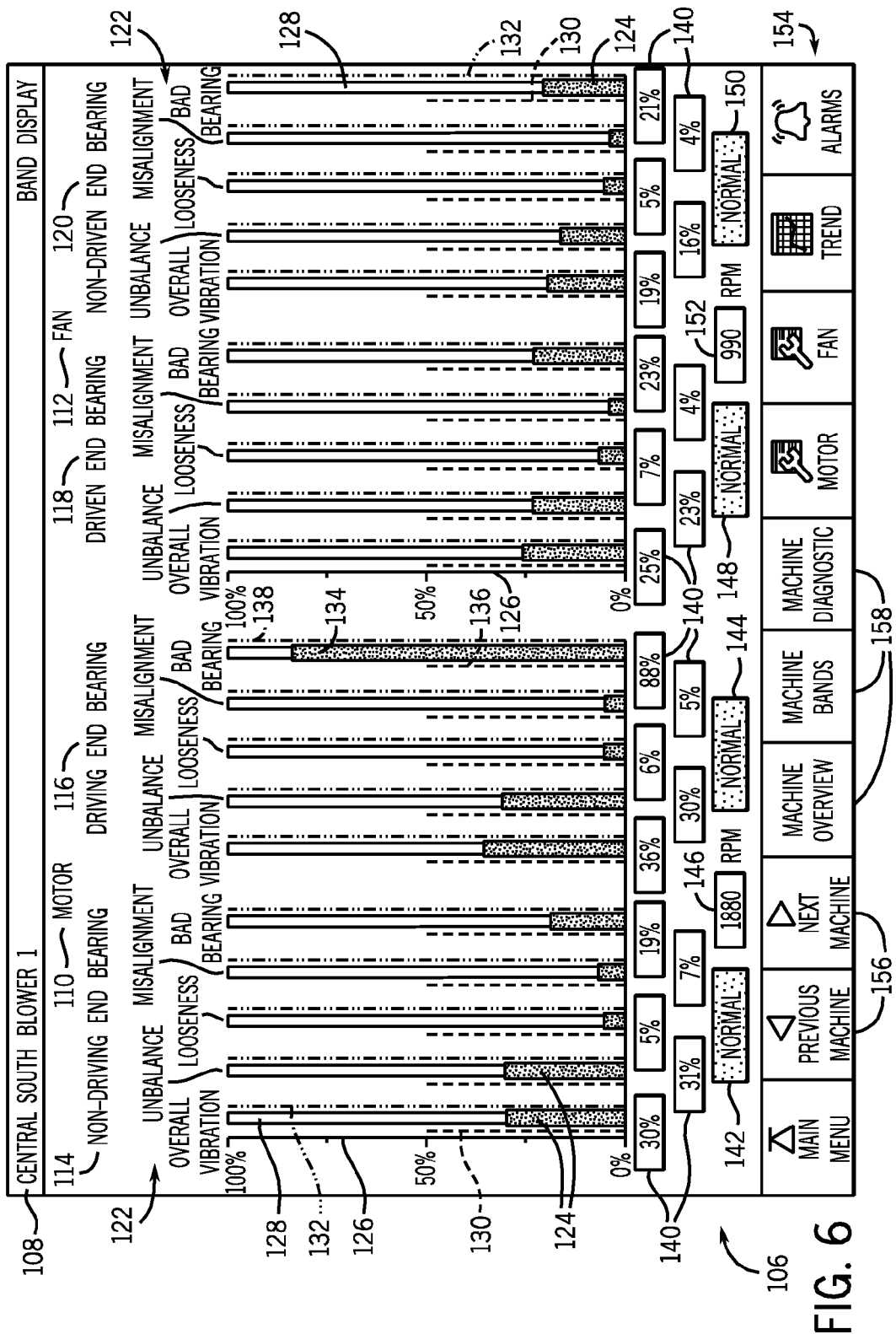
FIG. 6 is an illustration of a screen that displays machine condition monitoring information, including normalized vibration parameters, in accordance with an embodiment of the present technique.
Figure 7:
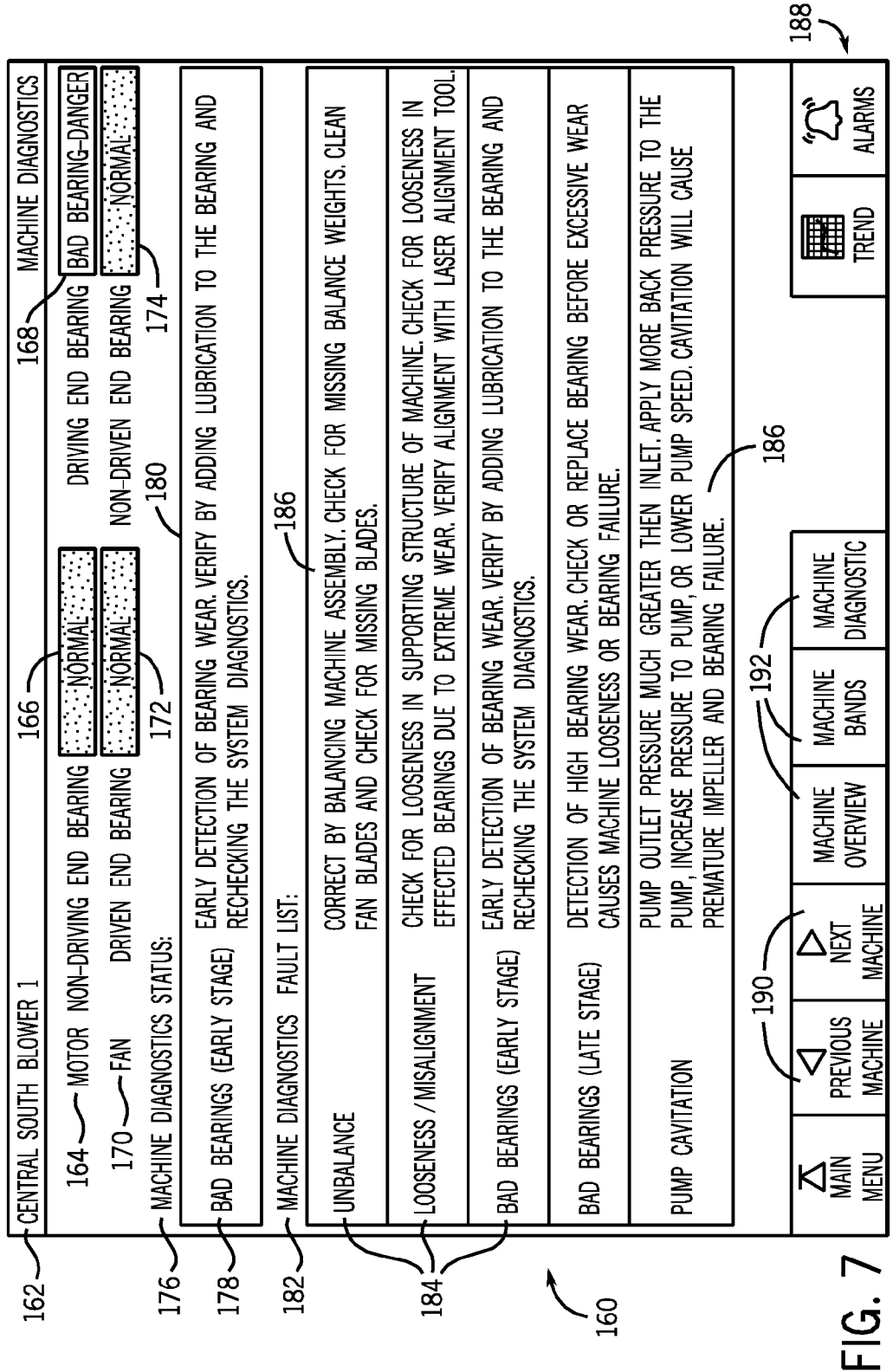
FIG. 7 is an illustration of a screen that displays machine condition monitoring information, including diagnostic information, in accordance with an embodiment of the present technique.
Figure 8:
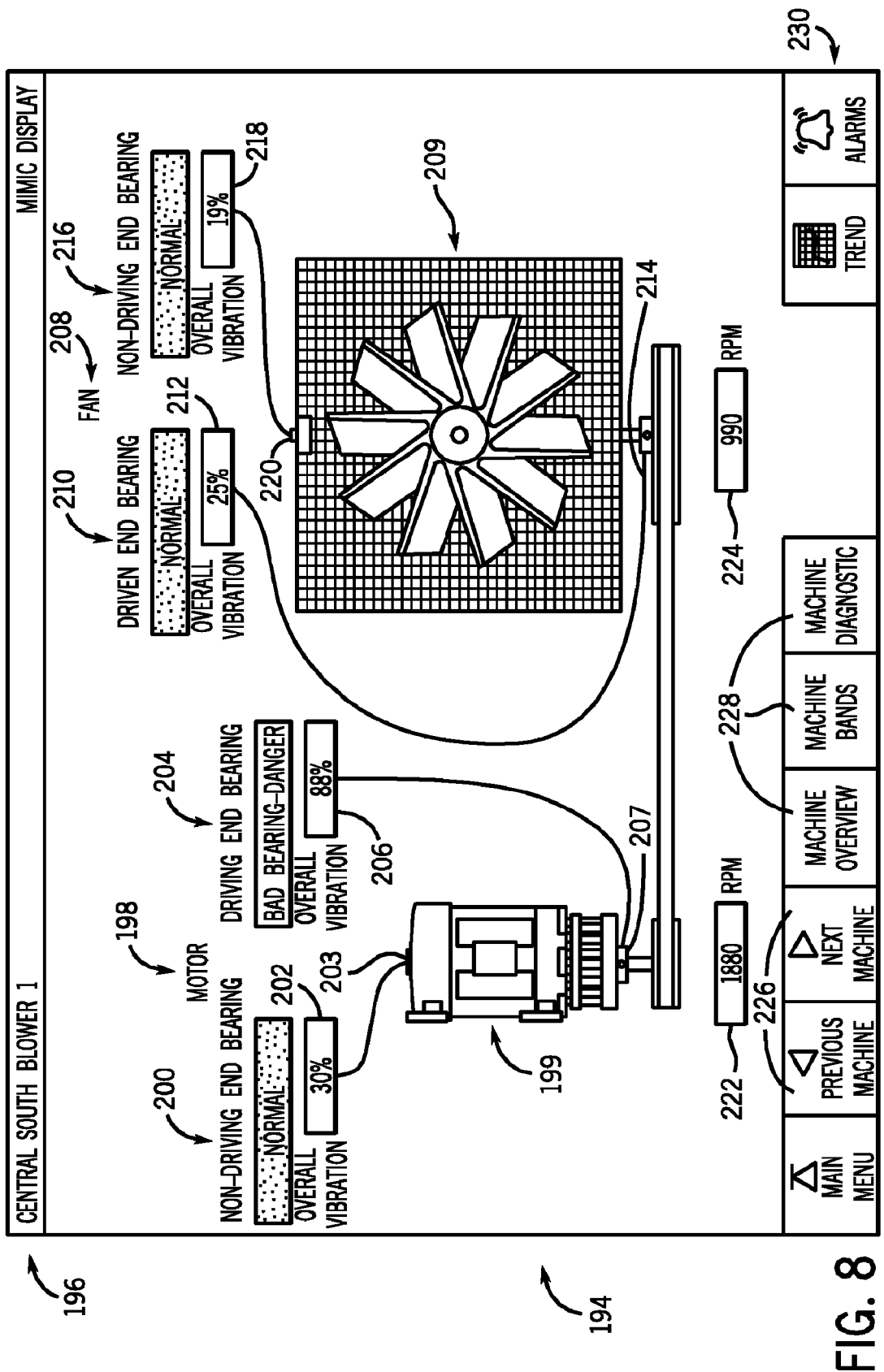
FIG. 8 is an illustration of a screen that displays machine condition monitoring information, including a system schematic, in accordance with another embodiment of the present technique.

FIGS. 6-8 illustrate embodiments of screens that display machine condition monitoring information to an operator. In an embodiment, the screens display vibration parameter and vibration diagnostic information. These screens may be displayed on the operator/user interfaces 14, 40, and 46 shown in FIG. 1. Embodiments of the operator interface screens may include a system of windows, icons, menus, and pointing devices to enable navigation through various screens of the machine condition monitoring software 52. The operator interface may include a display device, such as an LCD, for displaying the windows, icons, and menus, as well as text and graphics that may be arranged as a series of screens, layers, tabs, and templates. One or more input devices, such as buttons, wheels, a computer mouse, and a touch screen, may be used for navigating through the windows, icons, and menus.

FIG. 6 illustrates an embodiment of display screen 106, includes normalized vibration parameters that may be displayed to a system operator. Screen 106 includes machine system type indicator 108, shown in the illustration as "Central South Blower 1." As depicted, the configured machine type 108 is displayed along with corresponding normalized vibration parameters. In addition, multiple machine systems may be configured for a machine condition and control system 10. Specifically, in this embodiment the particular machine system being displayed to an operator will be indicated at the top of the screen, shown by numeral 108. For example, indicator 108 may cycle through display of Central South Blower 1, Central South Blower 2, Central Motor 1, and Central Motor 2, as the operator views normalized vibration parameters for each of the configured machine systems. Screen 106 also includes information divided into motor section 110 and fan section 112. In the embodiment, motor section 110 includes non-driving end 114 and driving end bearing 116 sections. Fan section 112 also includes driven end bearing 118 and non-driven end bearing 120. In other embodiments, different or additional sections may be included instead of or alongside sections 110, 112, 114, 116, 118, and 120. In addition, bearing sections 110 and 114 each include five vibration parameter headings 122. More or less condition monitoring parameters may be displayed for each section depending upon application specific criteria. As depicted, vibration parameter headings 122 include categories such as overall vibration, unbalance, looseness, misalignment and bad bearing. Each of these headings 122 correspond to a bar chart and a numeric value for the respective vibration parameter. Normalized vibration parameters 124, in the form of bar charts, are drafted below each of the headings 122.

Each of the normalized parameter bar charts 124 are displayed from a scale of 0% to 100%. As depicted, the raw data taken from the machine conditioning monitoring and control system 10 is received and scaled, as shown in bar charts 124 and scale 126. In an embodiment, 100% may be the reading for the particular vibration parameter where automatic shutdown occurs. In another embodiment, the automatic shutdown alarm value may be 70%, 80%, or 90%. In addition, the alarm value may correspond to another system function, such as an audible and/or visual alarm instead of an automatic shut down. Further, several alarms may be set for each of the vibration parameter displays, illustrated as alarm one 130 and alarm two 132. In an embodiment, alarm one 130 may be an initial warning value, indicating to an operator that a particular vibration parameter 122 and/or machine system should be inspected. For example, in the illustration, the bar chart 134 indicates a normalized value that exceeds alarm one value 136 of bad bearing parameter. In the example, a normalized reading will provide a warning to the operator that driving end bearing 116 may require an inspection of the motor driving end bearing. Further, bad bearing alarm two 138 at 100% has not been met, thereby indicating that the system does not need require an automatic shut down.

As appreciated, the alarm values and scaled values shown in the normalized display screen 106 may be configured depending upon the system and sensor inputs. Numerical indicators 140 display normalized numeric values associated with the normalized bar charts 124 above each of the indicators 140. In addition, status indicator 142 may provide an operator with the status of the bearing being displayed above the indicator. For instance, status indicator 142 displays a normal status for motor non-driving end bearing 114. Further, status indicator 144 provides a status for driving end bearing 116. Indicator 146 displays a rotational speed for the shaft of motor 110, thereby providing a numeric indicator of the rotational speed of motor 110. In the embodiment, the rotational speed of the shaft is indicated in RPM. Screen 106 also includes bearing status indicators 148 and 150, as well as fan shaft rotational display 152. Screen 106 also includes menu bar 154, which includes buttons to navigate between screens that may display normalized data for the particular machine system, configuration screens, and allow an operator to navigate between machines. Specifically, buttons 156 allow an operator to view normalized bar charts for other machine systems by pressing either button. Moreover, buttons 158 enable an operator to select between normalized parameter displays, configuration menus, diagnostic screens, and other screens for a machine system.

FIG. 7 is an illustration of an embodiment of screen 160 which displays diagnostic information for a machine system connected to condition monitoring and control system 10. Screen 160 includes a machine system indicator 162 that indicates which machine system within the machine conditioning monitoring and control system 10 is being viewed. For example, in the illustrated embodiment, the diagnostic information for "Central South Blower 1" machine system is displayed indicator 162. In addition, display screen 160 includes a motor section 164 that includes status indicators for non-driving end bearing 166 and driving end bearing 168. Specifically, the status indicator 166 for non-driving end bearing may display a status for the bearing, such as warning, danger, or normal. As depicted, driving end bearing of the motor indicates via indicator 168 that a bad bearing may be occurring via the "Bad Bearing Danger" status. Fan section 170 of display screen 160 also includes status indicators 172 and 174 for both bearings included in the fan system. Display screen 160 also shows the diagnostic status for the particular machine system, as depicted by element 176. The machine diagnostic status may be displayed in text box 178, thereby informing the operator of any warnings as well as instructions or diagnostic messages 180 to address the diagnostic problem.

In addition, a fault list section 182 may be provided for the machine diagnostic display screen 160. The machine diagnostic fault list 182 may include several condition monitoring or vibration parameters 184 that exhibit faults or trigger a diagnostic message display. For example, if a particular vibration parameter, such as unbalance, exceeds a certain preset warning or alarm level then a diagnostic message 186 may be communicated to help an operator address the problem indicated by the unbalance vibration parameter value. Diagnostic display screen 160 also includes menu bar 188 that includes several buttons that allow the operator to select the machine system and information displayed on the screen. Menu bar 188 includes machine selection buttons 190 that enable the user or operator to change which machine is being displayed. For example, the operator may select to display Central South Blower 1 and its diagnostic information, followed by a selection to view the diagnostic information for Central Pump 1, based on the machine selected via buttons 190. Further, display selection buttons 192 enable an operator to select between normalized parameter displays, configuration menus, diagnostic screens, and other screens for a machine system.

FIG. 8 is an illustration of an embodiment of display screen 194, which includes the status and a schematic of a selected machine system. The machine system being displayed is illustrated by indicator 196. For instance, as depicted, "Central South Blower 1" is the machine being displayed in screen 194. The status and diagnostic information screen 194 includes a motor section 198 that illustrates the status and arrangement of sensors on a motor 199. In the embodiment, a diagram of a motor 199 shows an operator the arrangement of the condition monitoring and machine system components. Motor section 198 also includes non-driving end bearing display 200, which further includes a normalized bearing parameter display 202. Non-driving end bearing display 200 includes a status indication, illustrated here as "normal." Further, display 200 includes normalized bearing parameter display 202, which informs the user of a normalized overall vibration parameter that has been scaled, thereby enabling the operator to view the parameter on a percentage basis. For example, the overall vibration normalized reading of 30% may indicate to an operator that the system is normal at the non-driving end bearing of the motor. The machine conditioning monitoring and control system 10 may configure and/or automatically load alarm values for each system based on an operator selection during auto-configuration of a machine system by an operator. In other words, the operator may select a machine type and number of sensors, as well as the type of sensors in the system, thereby enabling the system to configure alarm limits, filter values, and other information based upon the machine system components selected. Moreover, the selected machine system type enables the system to normalize information, such as the diagnostic, status, and data display for an operator based on a data information table that corresponds to the machine system type being monitored. In one embodiment, a range of normalized parameter values may be based on a scale of 0-100%.

Status and diagnostic display screen 194 also includes an indicator of the location of the bearing sensor 203 on motor 199. The bearing location 203 illustrated in display 194 enables a user to easily locate and troubleshoot problems with the machine system. Similarly, driving end bearing status display 204 includes a status indicator as well as a normalized bearing parameter indicator 206. As depicted, indicator 206 shows that a normalized reading of 88% corresponds to a status of "Bad Bearing-Danger" for the driving end bearing display 204. Therefore, the danger display is caused by the scaled value of 88% exceeding a preset alarm value that has been loaded for the motor driving end bearing for a blower machine type profile. In addition, an operator may use sensor location 207 to locate the position of the bearing needing attention. In addition, fan section 208 also includes driven end bearing section 210, which displays the status of the bearing via a dialog box and a normalized vibration parameter 212. Moreover, fan section 208 also includes a diagram of a fan 209. The diagram of a fan 209 includes a location for driven end bearing sensor, as shown by element 214. In addition, status display 216 includes a status box and a normalized vibration parameter display 218. Further, the non-driven end bearing status portion 216 illustrates the position 220 of the non-driven end bearing sensor on fan system 209. Indicators 222 and 224 display the rotational shaft speeds of the motor and fan assemblies, respectively, in RPMs. Status and diagnostic screen 194 also includes machine selection buttons 226 and information selection buttons 228, which are included in menu bar 230. Specifically, buttons 226 allow an operator to view normalized bar charts for other machine systems by pressing either button. Moreover, buttons 228 enable an operator to select between normalized parameter displays, configuration menus, diagnostic screens, and other screens for a machine system.

As appreciated, the screens shown in FIGS. 6-8 may include several variations of the illustrated embodiments, including additional parameters, diagnostic messages, graphs, charts, and diagrams. Additionally, condition monitoring and control system 10 may display more screens in addition to 106, 160, and 194, in order to present normalized parameters and simplified diagnostic information to an operator.

Figure 9:
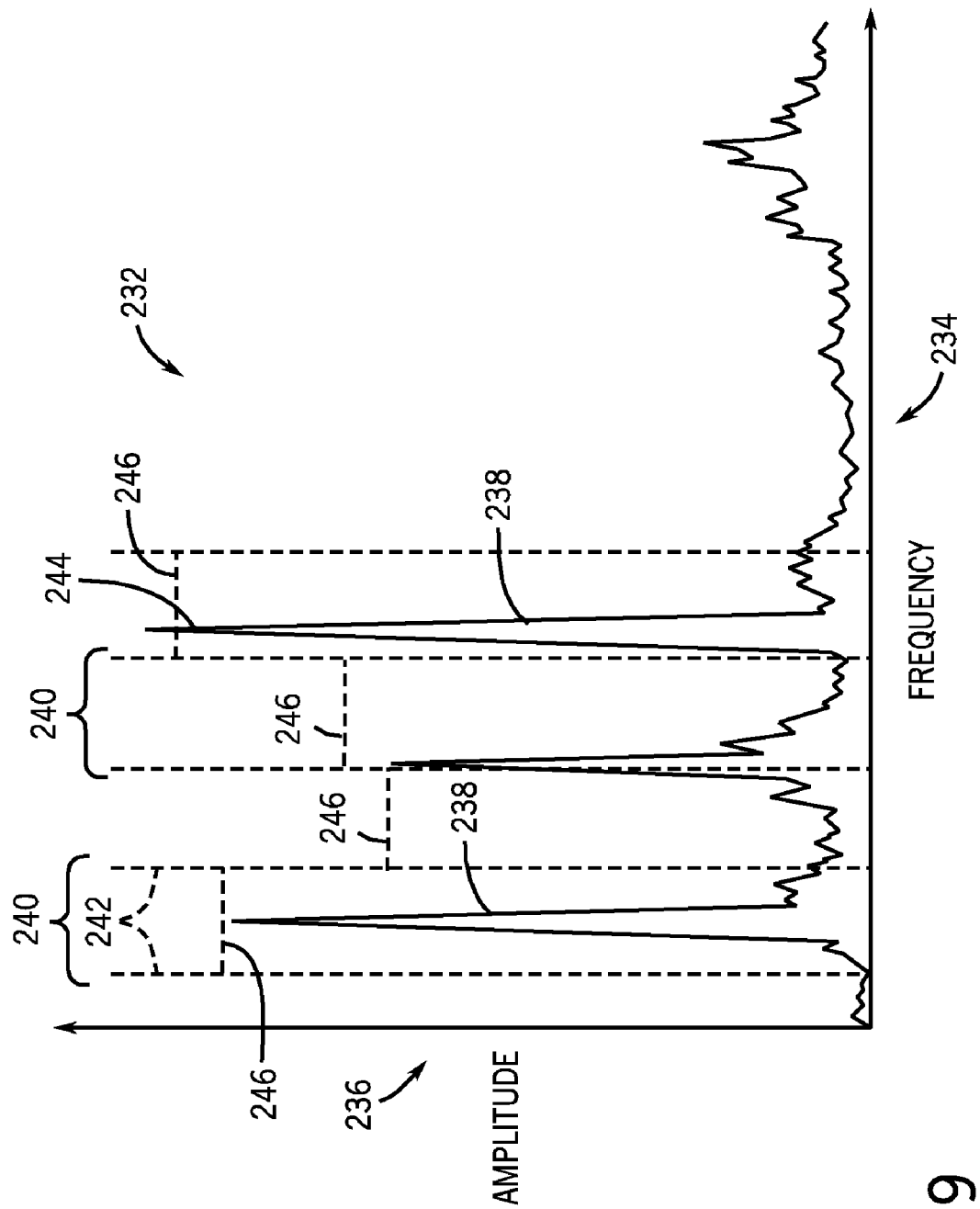
FIG. 9 is an illustration of a vibration profile used by a condition monitoring and control system, in accordance with another embodiment of the present technique.

FIG. 9 is an embodiment of chart 232 displaying a fast Fourier transform (FFT) that has been performed on time domain data, producing the illustrated vibration profile for a bearing. The FFT calculation is an example of the type of calculation performed by function block, previously shown in FIG. 3, that is utilized by condition monitoring and control system 10. An FFT algorithm may take data from the time domain, i.e. measurements taken at finite time intervals and produce a frequency domain signal. The FFT is a class of algorithms that compute or calculate the magnitude of energy versus frequency for a given time domain signal. Referring to chart 232, a signal frequency is plotted on X-axis 234 while an amplitude 236 is plotted on Y-axis 236. The plotted FFT data 238 illustrates the vibration profile as the amplitude of the signal at a range of frequencies. Chart 232 also includes frequency bands of interest 240 that span frequency ranges between lines 242. The bands of interest 240 may correspond to ranges of interest and of vibration data for the bearings being monitored. Specifically, the ranges of bands 240 may include data, such as spike 244, that exceeds an alarm value 246, indicating a warning or danger for a bearing. In an embodiment, an accelerometer sensor may relay time domain data to the controller and monitor 12 which may perform the FFT function block 64 on the raw time domain data. In addition, the results of the FFT function block may feed the information to an operator interface 14 that provides normalized vibration parameters to the user indicating the status of a bearing being analyzed. As a result, the operator may assess the status of a machine system or bearing without in-depth knowledge of an FFT or other condition monitoring calculations. This may be accomplished by translating the output of the FFT function block to scaled normalized vibration parameters that may indicate a normal or warning status for the machine system.

As discussed above, various embodiments of machine condition monitoring systems may be employed to enhance the functionality of control systems, and to combine functionality of conventional control systems and condition monitoring systems. Moreover, the techniques described above may help simplify and reduce the costs of machine condition monitoring. In particular, an embodiment includes function blocks for calculating complex condition monitoring parameters, such as fast Fourier transfer FFT calculations based on vibrational measurements. These module function blocks enable these calculations to be made on systems that are used for machine control, consolidating the components needed for machine condition monitoring systems. In certain embodiments, the condition monitoring system includes an automatic configuration for the machine systems, allowing untrained operators to easily configure and set up the condition monitoring systems. For example, the system may enable an operator to set up the condition monitoring system by simply entering the type of machine system being monitored as well as the number and type of sensors being used. In an embodiment, the condition monitoring system may present the system condition parameter information in a normalized format that is easily understood by an untrained operator. In particular, the system will enable an operator who is knowledgeable about the control systems to assess the state of the system using normalized indicators of condition monitoring parameters. Further, the system will provide an operator with prioritized troubleshooting and diagnostic information to assist the operator with system repair.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for vibration condition monitoring and controlling a machine system, comprising:
   controlling operation of a machine system via sending control commands to actuators and receiving a first signal from at least one sensor, the controlled machine system producing vibration during operation;
   receiving a second signal from a vibration sensor coupled to the machine system and detecting the vibration produced;
   calculating vibration parameters based on the second signal;
   normalizing each of the vibration parameters, wherein normalizing each of the vibration parameters comprises scaling each of the vibration parameters; and
   presenting the normalized vibration parameters in an operator interface during controlled operation of the machine system.

2. The method of claim 1, wherein the vibration parameters are scaled with respect to alarms for specific vibration frequency bands.

3. The method of claim 2, wherein the alarms are determined by a selection of a system type, the system type corresponding to specific machine component combination.

4. The method of claim 2, wherein the normalized vibration parameters are displayed along with alarms for each normalized vibration parameter.

5. The method of claim 1, wherein presenting the normalized vibration parameters comprises presenting an overall vibration parameter, an unbalance parameter, a looseness parameter, a misalignment parameter, or a bearing parameter.

6. The method of claim 1, wherein calculating the vibration parameters comprises calculating a fast Fourier transform or a spike energy value.

7. The method of claim 1, wherein the vibration sensor comprises an accelerometer.

8. The method of claim 1, comprising presenting diagnostic information that includes status information and system faults.

9. The method of claim 8, wherein the presenting diagnostic information comprises prioritizing the information and faults in order of importance to an operator.

10. A machine control and condition monitoring system, comprising:
    a controller configured to receive sensor signals from a machine system and to control operation of the machine system via actuators;
       wherein the controller processes vibration measurement data and calculates the normalized vibration parameters; and
       wherein normalizing each of the vibration parameters comprises scaling each of the vibration parameters; and
    a condition monitoring user interface configured to display normalized vibration parameters for the machine system during controlled operation of the machine system.

11. The system of claim 10, wherein the vibration measurement data is from an accelerometer.

12. The system of claim 10, wherein the calculations of the normalized parameters are based upon a selection of a system type, the system type corresponding to specific machine component combination.

13. The system of claim 10, wherein the normalized vibration parameters comprise an overall vibration parameter, an unbalance parameter, a looseness parameter, a misalignment parameter, or a bad bearing parameter.

14. The system of claim 10, wherein the condition monitoring user interface is also configured to display diagnostic information including status information and system faults.

15. The method of claim 14, wherein the condition monitoring user interface is configured to display the diagnostic information prioritized in order of importance to an operator.

16. A machine system controller, comprising:
    computer code to control operation of a machine system via actuators;
    computer code to perform vibration monitoring of the machine system;
       wherein the vibration monitoring computer code comprises code to process vibration measurement data and calculate the normalized vibration parameters; and
       wherein normalizing each of the vibration parameters comprises scaling each of the vibration parameters; and
    a vibration monitoring user interface configured to display normalized vibration parameters for the machine system during controlled operation of the machine system.

17. The system of claim 16, wherein the vibration measurement data is from an accelerometer.

18. The system of claim 16, wherein the normalized vibration parameters are scaled with respect to alarms for specific vibration frequency bands.

19. The system of claim 16, wherein the normalized vibration parameters comprise an overall vibration parameter, an unbalance parameter, a looseness parameter, a misalignment parameter, or a bearing parameter.

20. The system of claim 16, wherein the vibration monitoring user interface is also configured to display diagnostic information including status information and system faults.

21. The system of claim 20, wherein the diagnostic information is prioritized in order of importance to an operator.

* * * * *